June 28, 1927.

R. G. JONES 1,633,989

TRANSMISSION

Filed Dec. 5, 1925   2 Sheets-Sheet 1

INVENTOR:
RICHARD GIRARD JONES,
BY
ATTORNEY

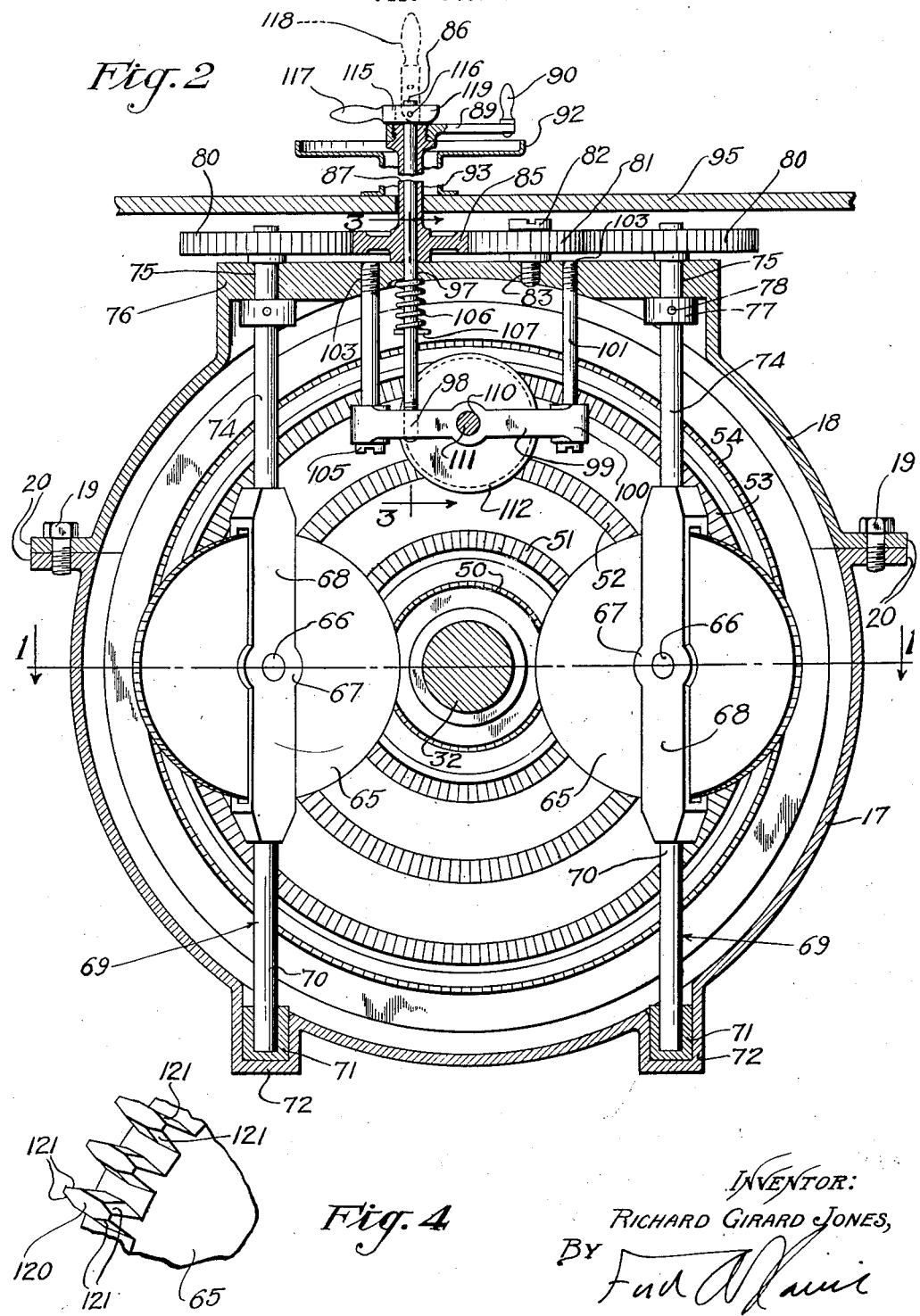

Patented June 28, 1927.

1,633,989

UNITED STATES PATENT OFFICE.

RICHARD GIRARD JONES, OF HYNES, CALIFORNIA.

TRANSMISSION.

Application filed December 5, 1925. Serial No. 73,373.

My invention relates to a device for transmitting motion from one shaft to another, and embodies a novel transmission which may be used for automobiles or machinery where one shaft is to drive another shaft at a number of different speeds.

It is an object of this invention to provide a transmission in which the drive and driven gears are novelly arranged so that the transmission occupies but a small space and has a greater number of and larger range of gear shifts in a given space than is possible in the ordinary transmission.

It is another object of the invention to provide a transmission of this character in which the shifting of gears is very easy.

It is a further object of the invention to provide a transmission in which the drive and driven gears are placed in circular arrangement so that a transmitter gear may be rotated to engage different pairs of drive and driven gears.

Another object of my invention is to provide a transmission of the character mentioned in which the transmitter gear is enclosed by the drive and driven members which carry the drive and driven gears.

It is a further object of the invention to provide a transmission of this character in which the transmitter gear is shifted by rotating an arm which indicates the gear ratio of the drive and driven gears being engaged on the dial.

Other objects and advantages of the invention will be made evident hereinafter.

Referring to the drawings in which I illustrate a preferred embodiment of my invention, Fig. 1 is a section of a transmission embodying the features of my invention, this view being taken as indicated by the line 1—1 of Fig. 2.

Fig. 2 is a section through the transmission taken on the line 2—2 of Fig. 1.

Fig. 4 is a diagrammatic view illustrating the form of teeth used on certain gears of this invention.

Figure 1:
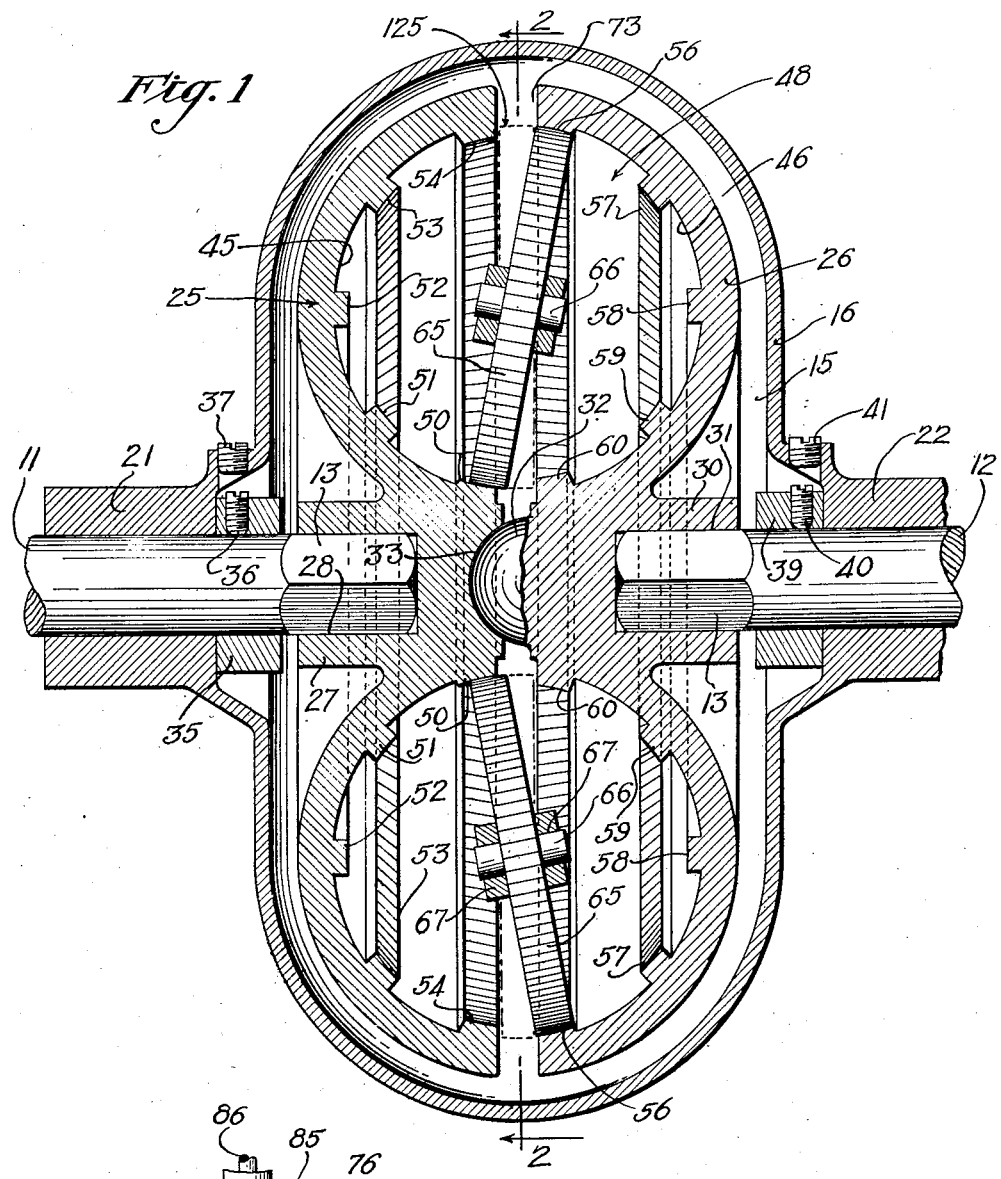
Figure 3:
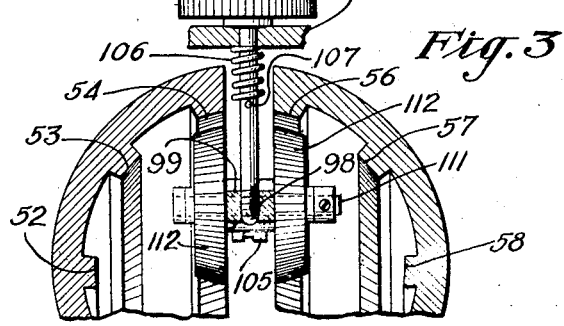
Fig. 3 is a fragmentary section showing back gear means of my invention, this view being taken as indicated by the line 3—3 of Fig. 2.

Referring to the drawings, 11 indicates a drive element in the form of a drive shaft and 12 indicates a driven element in the form of a driven shaft. The inner ends of the drive and driven shafts 11 and 12 are provided with polygonal portions 13 and they extend into a chamber 15 of a housing 16. The housing 16 is provided to protect the parts of the transmission and to carry oil for lubricating the parts. The housing 16 consists of a lower part 17 and an upper part 18 which are secured together by cap screws 19 which extend through flanges 20 of the parts 17 and 18. The lower part 17 provides a bearing 21 which rotatably supports the drive shaft 11, and a bearing 22 which rotatably supports the driven shaft 12. Residing in the chamber 15 is a drive member 25 and a driven member 26. The drive member 25 has a hub 27 provided with a polygonal cavity 28 which is adapted to receive the polygonal portion 13 of the drive shaft 11. The driven member 26 has a hub 30 having a polygonal cavity 31 which is adapted to receive the polygonal portion 13 of the driven shaft 12. The driven member 26 has a central ball formation 32 which is adapted to rest in a socket 33, thus providing a bearing between the drive and driven members 25 and 26. The drive shaft 11 is locked from axial movement by a collar 35 which is secured thereon by a set screw 36, this set screw being tightened through an opening closed by a threaded plug 37. The driven shaft 12 is locked from axial movement by a collar 39 which is secured thereon by a set screw 40, this set screw 40 being adjusted through an opening closed by a threaded plug 41. The ends of the shafts 11 and 12 are held by the collars 35 and 39 so that they engage the drive and driven members 25 and 26 in order to retain the ball 32 in the socket 33.

The drive member 25 provides an annular semi-cylindrical channel 45 and the driven member 26 provides an annular semi-cylindrical channel 46. As shown best in Fig. 1 the annular semi-cylindrical channels 45 and 46 are spaced adjacent to each other so that their centers register and so that they provide an annular and substantially cylindrical channel 48.

Carried by the drive member 25 in the annular cylindrical channel 48 is a series of drive gears 50, 51, 52, 53 and 54. Carried by the driven member in the annular cylindrical channel 48 is a series of driven gears 56, 57, 58, 59 and 60. The drive gears 50 to 54 and the driven gears 56 to 60 inclusive, are arranged in pairs so that there is a driven gear diametrically opposite to each drive gear.

Situated in the annular cylindrical channel 48 is a pair of transmitter gears 65. The transmitter gears 65 are adapted to engage pairs of drive and driven gears. For example, as shown in the drawings, the transmitter gears 65 are shown in engagement with the drive gear 50 and the driven gear 56. The transmitter gears 65 have trunnions 66 which extend through bearings 67 of yoke portions 68, these yoke portions 68 being a part of gear supporting members 69. Extending downward from the yoke portion 68 are lower shafts 70, the lower ends of which are journaled in bearings 71 which are supported in cup formations 72 of the housing 16. Extending upward from the yoke portions 68 are upper shafts 74. The upper shafts 74 extend upward through bearing openings 75 formed in a table portion 76 of the upper part 18 of the housing 16. Collars 77 are secured to the upper shafts 74 by pins 78 for locking them against axial movement.

The upper ends of the upper shafts 74 extend from the annular cylindrical channel 48 through a space 73 which exists between the peripheries of the drive and driven members 25 and 26 and extend to the outside of the housing 16 and have outer gears 80 secured thereto, these gears being positioned directly above the table 76. Meshing with one of the gears 80 is an intermediate gear 81 which is journaled on a pin 82 which is threadably secured at 83 to the table 76. Meshing with the other of the gears 80 is an intermediate gear 85 which is journaled on a rod 86. The intermediate gears 81 and 85 are also in mesh. Extending from the intermediate gear 85 is an extension 87 which is threaded at the upper end so that an operating arm 89 may be threadably secured thereto. This operating arm 89 has a handle 90 by means of which the intermediate gear 85 may be rotated in order to drive the other gears 80 and 81. The operating arm 89 is adapted to rotate above a dial 92 which is formed at the upper end of a tube 93, this tube 93 surrounding the extension 87 and being secured to a floor 95. The dial 92 is marked so as to indicate the positions occupied by the transmitter gears 65.

The rod 86 on which the intermediate gear 85 journals extends through an opening 97 of the table 76 and into the annular cylindrical channel 48, this rod 86 extending through the space 73 between the peripheral parts of the drive and driven members 25 and 26. The inner end of the rod 86 is threadably secured at 98 to a bracket 99. The bracket 99 has bearings 100 formed at the opposite ends thereof which surround guides 101. These guides 101 extend through the openings 73 and are threadably secured at 103 to the table 76 of the upper part of the housing 16. The lower ends of the guides 101 are provided with enlargements 105 and a coil spring 106 is compressed between a pin 107 carried by the rod 86 and a lower face of the table 76. This spring is provided for the purpose of resiliently holding the bracket 99 in engagement with the enlargements 105 of the guides 101.

The bracket 99 is provided with a central bearing 110 which rotatably supports a shaft 111 of a back gear means of my invention. The shaft 111 has back gears 112 secured on the ends thereof on opposite sides of the bracket 99. These back gears 112 are adapted to engage the adjacent gears 54 and 56 of the drive and driven members 25 and 26. When the bracket 99 is in engagement with the enlargement 105 the back gears 112 are out of engagement. An operating lever 115 is hingedly secured at 116 to the upper end of the rod 86 which extends upward from the projection 87. This operating lever 115 has a handle 117 by which it may be swung into a position indicated by dotted lines 118 of Fig. 2. A butt end 119 of the operating lever 115 is at this time brought into engagement with the upper end of the extension 87 and the rod 86 is pulled axially upward against the action of the coil spring 106. The bracket 99 is moved therewith sliding on the guides 101, and the back gears 112 are brought into engagement with the drive gear 54 and the driven gear 56.

Since the transmitter gears 65 must engage different types it is necessary to provide these gears with special teeth. Referring to Fig. 4, the transmitter gears 65 have teeth 120 which are curved at 121 so that the ends taper off and the teeth are somewhat diamond-shape. The teeth 120 may be narrower than ordinary spur teeth and may be much narrower at the outer edges than ordinary spur teeth. It is also desirable to round the corners of the teeth of drive and driven gears so that meshing may be facilitated. It should be understood that I may use any type of teeth which are satisfactory.

The operation of my invention is substantially as follows:

From the drawings it will be seen that the transmitter gears 65 may rest between the pairs of drive and driven gears and be in neutral position. It is desirable, however, to place the transmitter gears in a neutral position as indicated by dotted lines 125 of Fig. 1 so that they may be moved into low gear positions, as shown in full lines in the drawings. The transmitter gears 65 are moved into low gear positions by operating the operating arm 89. This rotates the intermediate gears 85 and 81 which turn the outer gears 80 in opposite directions. The gear supporting members 69 are turned in opposite directions and the transmitter gears 65 are rotated in the positions shown in full lines in Fig. 1. The transmitter gears 65 are swung into engagement with the next pair of gears which are the drive gear 51 and the driven gear 57, by further operating the operating arm 89. The transmitter gear 65 may be swung into engagement with any pair of drive and driven gears by a further swinging of the operating arm 89.

When the driven shaft 12 is to be run in a reverse direction, the back gear means is employed. The transmitter gears 65 are moved into neutral position and the operating lever 115 is then moved into the position indicated by dotted lines 118 of Fig. 2. This causes the back gears 112 to engage the gears 54 and 56 as previously mentioned. This locks the drive and driven members 25 and 26 together, causing them to rotate in the same direction. When the transmitter gears are in engagement, the drive and driven gears are rotated in opposite directions.

The transmission of my invention is so designed that it provides a greater number of gear shifts in a given compacted space than can be obtained in the ordinary form of gear shifts. This is possible because of the circular arrangement of the drive and driven gears in the annular cylindrical channel 48. Simplicity of operation is a feature of the invention. Both of the transmitters are operated by the operating arm 89, and to shift the gears it is only necessary to swing this operating arm 89 a short distance. Furthermore, the operating arm may be situated in any convenient position.

I claim as my invention:

1. In combination: a drive element; a driven element; a drive member secured to said drive element, said drive member having an annular semi-cylindrical channel; a driven member secured to said driven element, said driven member having an annular semi-cylindrical channel, said annular semi-cylindrical channels of said drive and driven members being located so as to form a substantially annular cylindrical channel; drive gears carried by said drive member within said annular cylindrical channel; driven gears carried by said driven member within said annular cylindrical channel, said drive and driven gears being arranged in pairs in said annular cylindrical channel so that a drive gear is placed diametrically opposite each of said driven gears; a transmitter gear situated in said annular cylindrical channel adapted to selectively engage pairs of said drive and driven gears; means for moving said transmitter gear into engagement with any pair of said drive and driven gears; guides extending into said annular cylindrical channel; a bracket slidable on said guides; back gear means carried by said bracket, said back gear means being adapted to engage adjacent drive and driven gears; and means for bringing said back gear means into engagement position.

2. In combination: a drive element; a driven element; a drive member secured to said drive element, said drive member having an annular semi-cylindrical channel; a driven member secured to said driven element, said driven member having an annular semi-cylindrical channel, said annular semi-cylindrical channels of said drive and driven members being located so as to form a substantially annular cylindrical channel; drive gears carried by said drive member within said annular cylindrical channel; driven gears carried by said driven member within said annular cylindrical channel, said drive and driven gears being arranged in pairs in said annular cylindrical channel so that a drive gear is placed diametrically opposite each of said driven gears; a transmitter gear situated in said annular cylindrical channel adapted to selectively engage pairs of said drive and driven gears; a gear supporting member for rotatably supporting said transmitter gear, a shaft of said gear supporting member extending to the exterior of said annular cylindrical channel between said drive and driven members; means for turnably supporting said gear supporting member; means for turning said gear supporting member; guides extending into said annular cylindrical channel; a bracket slidable on said guides; back gear means carried by said bracket, said back gear means being adapted to engage adjacent drive and driven gears; and means for bringing said back gear means into engagement position.

3. In combination: a drive element; a driven element; a drive member secured to said drive element, said drive member having an annular semi-cylindrical channel; a driven member secured to said driven element, said driven member having an annular semi-cylindrical channel, said annular semi-cylindrical channels of said drive and driven members being located so as to form a substantially annular cylindrical channel; individual drive gears carried by said drive member within said annular cylindrical channel; individual driven gears carried by said driven member within said annular cylindrical channel, said drive and driven gears being arranged in pairs in said annular cylindrical channel so that a drive gear is placed diametrically opposite each of said driven gears; a transmitter gear situated in said annular cylindrical channel adapted to selectively engage pairs of said individual drive and driven gears; means for moving said transmitter gear into engagement with any pair of said drive and driven gears, the diametric distance between the walls of said annular cylindrical channel being greater than the diameter of said transmitter gear, and the space between said individual drive gears and driven gears being sufficient to afford a neutral position for said transmitter gear where it may revolve without imparting motion to said driven member; and means for restraining said drive and driven members from relative axial movement, said drive and driven members being journalled together by a ball formation of one of said members and a socket of the other of said members in which said ball rests so that said drive and driven members cannot move together beyond certain positions.

In testimony whereof, I have hereunto set my hand at Los Angeles, California, this 30th day of November, 1925.

RICHARD GIRARD JONES.